Sharp & Shannon,
Harness-Saddle Tree and Pad,
Nº 84,071. Patented Nov. 17, 1868.

Witnesses:
Wm. A. Morgan.
Philip C. Dietrich.

Inventor:
W. A. Sharp.
J. A. Shannon.
per Munn & Co.
Attorneys.

WILLIAM A. SHARP AND JOHN A. SHANNON, OF TAMA CITY, IOWA.

Letters Patent No. 84,071, dated November 17, 1868.

IMPROVED HARNESS-TREE PAD.

The Schedule referred to in these Letters Patent and making part of the same.

*To all whom it may concern:*

Be it known that we, WILLIAM A. SHARP and JOHN A. SHANNON, of Tama City, in the county of Tama, and State of Iowa, have invented a new and improved Harness-Tree and Pad; and we do hereby declare that the following is a full, clear, and exact description thereof, which will enable others skilled in the art to make and use the same, reference being had to the accompanying drawings, forming part of this specification.

This invention relates to improvements in harnesses for horses, the object of which is to provide an improved arrangement of harness-tree and pad.

It consists in the peculiar construction of the pad, whereby important advantages are gained, as will be hereinafter more fully described.

Similar letters of reference indicate like parts.

Figure 1:
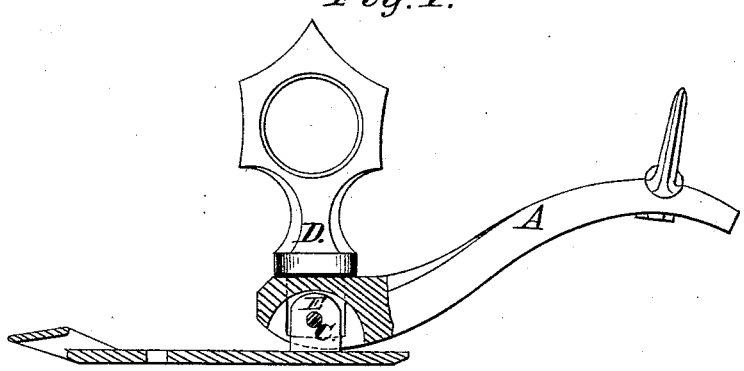
Figure 1 represents a section of one of our improved pads, and a partial elevation of the tree.
Figure 2:
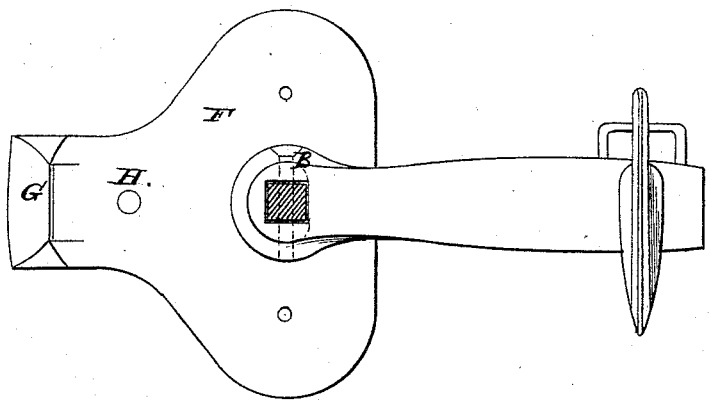
Figure 2 represents a plan view of the same.

A represents a portion of the bridge or tree, which is provided at each end with enlargements B, having square mortises through them for the reception of the lugs C of the pad, and the tenon of the terrets D, all of which are connected together by the bolt E.

The tree is made sufficiently arching to prevent it from contact with the animal's back.

F represents the pad, which is preferably made in the form shown, in order to provide a bearing-surface, of a considerable length, parallel with the animal's back. These pads may be made of metal or wood, or any substance that will give sufficient strength, and lined on their bearing-faces with any suitable material to protect the animals from injury.

G represents a loop, under which the strap, suspending the tug-buckle, may be passed, and secured by a bolt or rivet through the pad at H, instead of going around the loop, as in the ordinary construction.

By this arrangement we are enabled to provide a tree and pad, so connected together that the latter will always adjust itself to the figure of the animal's back, and therefore be materially less injurious to it, and which may also be constructed at less expense, and in a less number of pieces, while it is much more durable than those as now constructed.

Having thus described our invention,

We claim as new, and desire to secure by Letters Patent—

The pad F, made heart-shaped, or triangular, to increase its bearing-surface parallel with the animal's back, and having formed upon its outer and small end the loop G, for the passage of the tug-buckle strap, whose upper end is secured by a rivet passing through the hole H, and also provided with the two lugs C, between which the tenon of the terret D is secured by the bolt E, all arranged and operating as described, for the purpose specified.

WILLIAM A. SHARP.
JOHN A. SHANNON.

Witnesses:
F. J. M. HOUSER,
C. T. PENROSE.